(12) United States Patent
Lewis et al.

(10) Patent No.: US 7,715,825 B2
(45) Date of Patent: May 11, 2010

(54) PUSHBACK METHODS AND APPARATUS FOR USE IN COMMUNICATING MESSAGES TO MOBILE COMMUNICATION DEVICES

(75) Inventors: Allan David Lewis, New Dundee (CA); James Godfrey, Mississaugua (CA); Wen Gao, Waterloo (CA); Tabitha Kari Ferguson, Waterloo (CA); Ian Patterson, Petersburg (CA)

(73) Assignee: Research In Motion Limited, Waterloo, Ontario (CA)

( * ) Notice: Subject to any disclaimer, the term of this patent is extended or adjusted under 35 U.S.C. 154(b) by 157 days.

(21) Appl. No.: 11/238,069

(22) Filed: Sep. 28, 2005

(65) Prior Publication Data

US 2007/0072617 A1 Mar. 29, 2007

(51) Int. Cl.
*H04M 1/725* (2006.01)
(52) U.S. Cl. ............... 455/412.1; 455/412.2; 455/466; 709/207; 709/211; 709/216; 709/219; 370/428
(58) Field of Classification Search ............. None
See application file for complete search history.

(56) References Cited

U.S. PATENT DOCUMENTS

| | | | |
|---|---|---|---|
| 5,493,692 A | | 2/1996 | Theimer et al. |
| 5,742,905 A | * | 4/1998 | Pepe et al. ............ 455/461 |
| 5,958,006 A | * | 9/1999 | Eggleston et al. ........ 709/206 |
| 6,330,561 B1 | * | 12/2001 | Cohen et al. ............ 707/10 |
| 6,701,378 B1 | * | 3/2004 | Gilhuly et al. ............ 709/249 |
| 6,957,248 B2 | | 10/2005 | Quine et al. |
| 7,162,512 B1 | * | 1/2007 | Amit et al. ............ 709/206 |
| 2003/0224820 A1 | | 12/2003 | Einola et al. |
| 2004/0058644 A1 | * | 3/2004 | Saigo et al. ............ 455/11.1 |
| 2004/0224694 A1 | * | 11/2004 | Zhao et al. ............ 455/445 |
| 2006/0224750 A1 | | 10/2006 | Davies et al. |
| 2007/0011329 A1 | * | 1/2007 | Albert et al. ............ 709/226 |
| 2007/0223428 A1 | | 9/2007 | Patterson et al. |
| 2008/0263169 A1 | * | 10/2008 | Brabec et al. ............ 709/206 |

FOREIGN PATENT DOCUMENTS

DE 2009110 U1 8/2000

(Continued)

OTHER PUBLICATIONS

European Search Report for 05256056.2, Jul. 5, 2006.

(Continued)

*Primary Examiner*—Lester Kincaid
*Assistant Examiner*—Mehmood B Khan
(74) *Attorney, Agent, or Firm*—John J. Oskorep, Esq.

(57) ABSTRACT

One method involves the steps of causing a message to be sent to a relay network for delivery to a mobile device through one of a plurality of wireless networks coupled to the relay network; receiving, from the relay network, a result message when the mobile device is unavailable to receive the message, the result message comprising a message identifier; maintaining storage of the message in memory accessible by a host server after the result message is received; receiving, from the relay network, a status message which indicates that the mobile device is available to receive the message when the mobile device is available to receive the message; and causing the message to be sent again to the relay network for delivery to the mobile device in response to receiving the status message. During the unavailability, the relay network refrains from maintaining storage of the message.

26 Claims, 7 Drawing Sheets

FOREIGN PATENT DOCUMENTS

| | | |
|---|---|---|
| EP | 1 401 176 A2 | 3/2004 |
| EP | 1401176 A2 | 3/2004 |
| EP | 1540903 B1 | 7/2006 |
| WO | 0122669 A1 | 3/2001 |
| WO | 0176280 A2 | 10/2001 |
| WO | WO 01/76280 A2 | 10/2001 |
| WO | 2005018133 A2 | 2/2005 |
| WO | WO 2005/018133 A2 | 2/2005 |

OTHER PUBLICATIONS

Extended European Search Report, Aug. 23, 2008, EPO Application #08153610.

Michael Nadeau, "Your E-mail is Obsolete", BYTE Magazine, Feb. 1997, pp. 66-80. XP000680521.

"Push OTA Protocol"—Wireless Application Protocol, WAP-235-PushOTA-20010425-a—Apr. 2001—Version 25.

3rd Generation Partnership Project; Technical Specification Group Services and System Aspects; Support of Push Service (Release 5)—XP002290028—3GPP TR 23.875—V5.1.0 (Mar. 2002).

M. Crispin, Internet Message Access Protocol—Version 4rev1, XP-002122132, Dec. 1996, University of Washingtion.

Michael Nadeau, Your E-Mail Is Obsolete, XP 000680521, Feb. 1997.

European Search Report and Written Opinion for EP patent application 08159957.3, Date Aug. 19, 2009.

\* cited by examiner

PUSHBACK METHODS AND APPARATUS FOR USE IN COMMUNICATING MESSAGES TO MOBILE COMMUNICATION DEVICES

BACKGROUND

1. Field of the Technology

The present application relates generally to communications which involve mobile communication devices operating in wireless communication networks, and more particularly to communication techniques involving the pushing of messages to such mobile communication devices when the devices are unavailable in the wireless communication network.

2. Description of the Related Art

Mobile communication devices, such as mobile stations, have the ability to send and receive various data to and from other communication devices (e.g. telephones, servers, personal computers (PCs), etc.) through wireless communication networks. For example, mobile stations may be adapted to wirelessly receive copies of e-mail messages which are conventionally received and stored in email accounts on e-mail servers in communication networks. To accomplish this, many different host servers are utilized across the country and beyond to retrieve copies of e-mail messages from the many different e-mail servers for their intermediate delivery to a primary relay network. The primary relay network is communicatively coupled to a plurality of wireless communication networks and used to deliver the copied e-mail messages to mobile stations through any one of these networks.

If mobile communication devices become unavailable, however, the relay network may be overburdened with the storage and management requirements of all of the e-mail messages. This becomes increasingly problematic when the number of host servers and mobile devices which are served by the relay network increase substantially over time.

Accordingly, there is a resulting need for improved methods and apparatus for communicating messages to mobile communication devices.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

One illustrative method for use by a host server in pushing messages to a mobile communication device involves the steps of causing a message to be sent to a relay network for delivery to the mobile communication device through one of a plurality of wireless communication networks which are communicatively coupled to the relay network; receiving, from the relay network, a result message when the mobile communication device is unavailable to receive the message through the wireless communication network, the result message comprising a message identifier which uniquely corresponds to the message; maintaining storage of the message in memory accessible by the host server after the result message is received; receiving, from the relay network, a status message which indicates that the mobile communication device is available to receive the message when the mobile communication device is available to receive the message through the wireless communication device; and causing the message to be sent again to the relay network for delivery to the mobile communication device in response to receiving the status message. During the unavailability of the mobile device, the relay network refrains from maintaining storage of the message in memory of the relay network.

Another illustrative method for use by a relay network in pushing messages to a mobile communication device involves the steps of receiving, at the relay network, a message from a host server for delivery to the mobile communication device through. one of a plurality of wireless communication networks which are communicatively coupled to the relay network; causing a result message to be sent to the host server based on identifying that the mobile communication device is unavailable to receive the message through the wireless communication network, where the result message comprises a message identifier which uniquely corresponds to the message; refraining from maintaining storage and management of the message in memory of the relay network after the result message is sent to the host server; causing a status message which indicates that the mobile communication device is available to receive the message to be sent to the host server based on identifying that the mobile communication device is available to receive the message through the wireless communication device, where the status message comprises the message identifier which uniquely corresponds to the message; and receiving again, at the relay network, the message corresponding to the message identifier from the host server for delivery to the mobile communication device in response to the status message being sent to the host server.

Advantageously, messages are reliably delivered to mobile communication devices despite their temporary unavailability, without unduly burdening a relay network in terms of memory and processing power. Instead, responsibility of message delivery is "pushed back" to host servers once mobile device unavailability is identified; memory and processing power are spread across the numerous host servers which may be served by the relay network.

Figure 1:
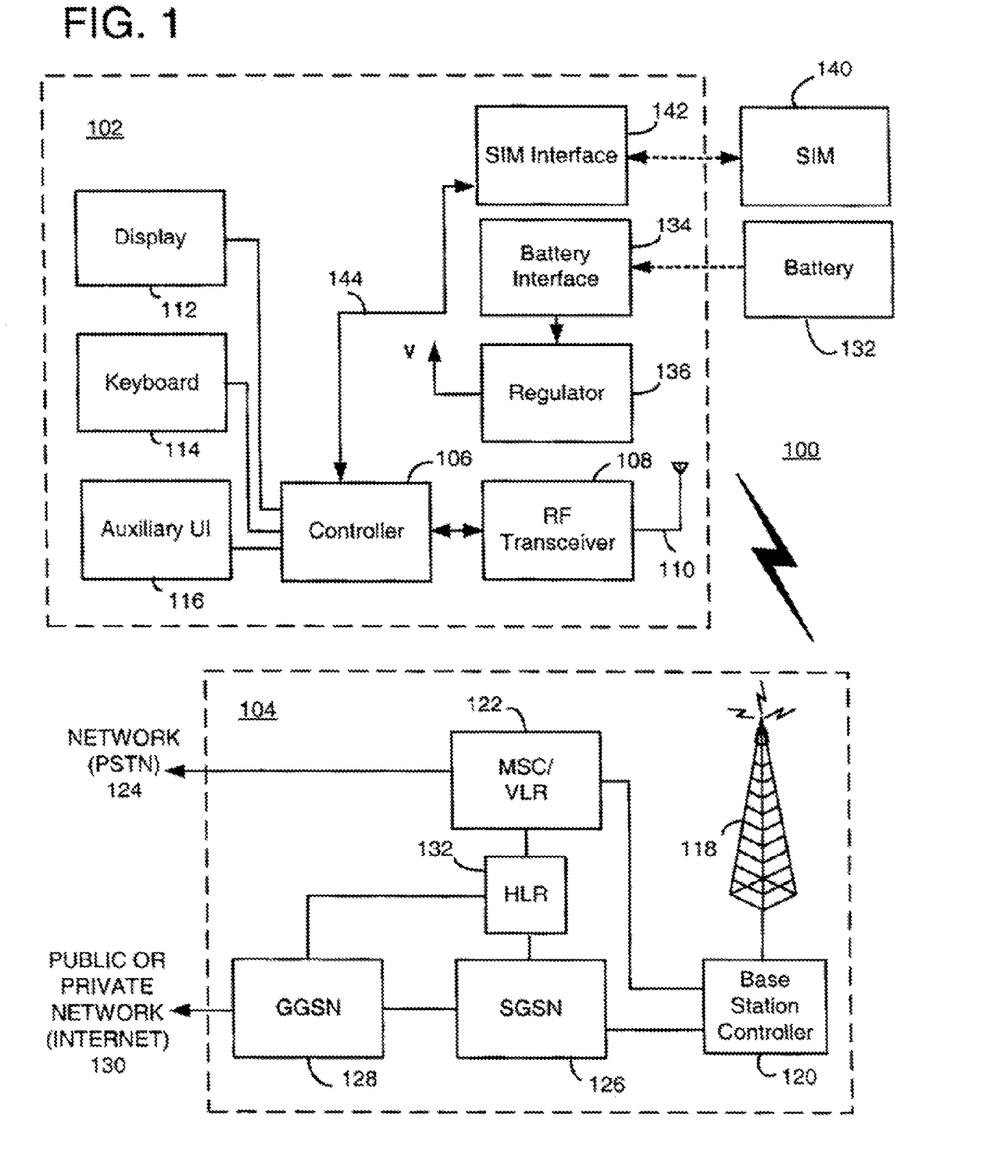
FIG. 1 is a block diagram of a communication system which includes a mobile station for communicating in a wireless communication network which may be its home communication network.

FIG. 1 is a block diagram of a communication system 100 which includes a mobile communication device 102 which communicates through a wireless communication network 104. In the preferred embodiment, mobile communication device 102 is a mobile station and therefore this term is used throughout this text. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces, with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of base station 120, including for example modulation/demodulation and possibly encoding/decoding and encryption/decryption. It is also contemplated that RF transceiver circuitry 108 may perform certain functions in addition to those performed by base station 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to (most if not all) electrical circuitry in mobile station 102, and battery interface 134 provides for a mechanical and electrical connection for battery 132. Battery interface 134 is coupled to a regulator 136 which regulates power for the device. When mobile station 102 is fully operational, an RF transmitter of RF transceiver circuitry 108 is typically keyed or turned on only when it is sending to network, and is otherwise turned off to conserve resources. Such intermittent operation of transmitter has a dramatic effect on power consumption of mobile station 102. Similarly, an RF receiver of RF transceiver circuitry 108 is typically periodically turned off to conserve power until it is needed to receive signals or information (if at all) during designated time periods.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry. 108 and antenna 110 of a single-unit device such as one of those described above.

Mobile station 102 may operate using a Subscriber Identity Module (SIM) 140 or similar device which is connected to or inserted in mobile station 102 at a SIM interface 142. SIM 140 is one type of a conventional "smart card" used to identify an end user (or subscriber) of mobile station 102 and to personalize the device, among other things. Without SIM 140, the wireless terminal is not fully operational for communication through wireless network 104. By inserting SIM 140 into the wireless terminal, an end user can have access to any and all of his/her subscribed services. In order to identify the subscriber, SIM 140 contains some user parameters such as an International Mobile Subscriber Identity (IMSI).

In FIG. 1, mobile station 102 communicates through wireless communication network 104. In the embodiment of FIG. 1, wireless network 104 is a Global Systems for Mobile (GSM) and General Packet Radio Service (GPRS) network, which is one type of wireless network in which a mobile station may operate. Wireless network 104 includes a base station 120 with an associated antenna tower 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to base station 120 and to a landline network, such as a Public Switched Telephone Network (PSTN) 124. SGSN 126 is coupled to base station 120 and to GGSN 128, which is in turn coupled to a public or private data network 130 (such as the Internet). HLR 132 is coupled to MSC 122, SGSN 126, and GGSN 128.

Base station 120, including its associated controller and antenna tower 118, provides wireless network coverage for a particular coverage area commonly referred to as a "cell". Base station 120 transmits communication signals to and receives communication signals from mobile stations within its cell via antenna tower 118. Base station 120 normally performs such functions as modulation and possibly encoding and/or encryption of signals to be transmitted to the mobile station in accordance with particular, usually predetermined, communication protocols and parameters, under control of its controller. Base station 120 similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically, due to limits in overall bandwidth and a limited battery power of mobile station 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by base station 120 instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

As apparent from the above, the wireless network includes fixed network components including RF transceivers, amplifiers, base. station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
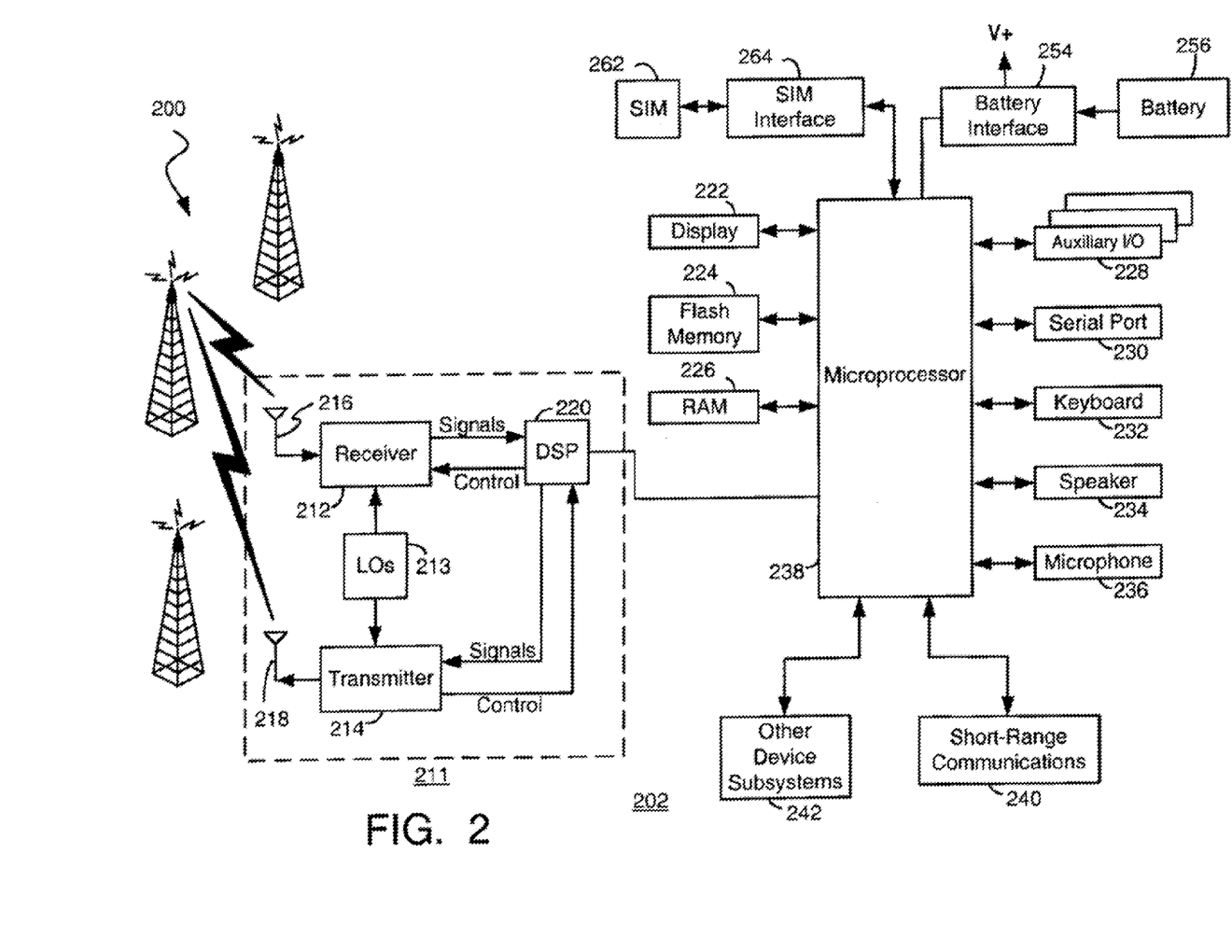
FIG. 2 is a more detailed example of a mobile station for use in the wireless communication network.

FIG. 2 is a detailed block diagram of a preferred mobile station 202 which may be utilized in system 100 of FIG. 1. Mobile station 202 is a two-way communication device having at least voice and data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 includes a battery interface 254 for receiving one or more rechargeable batteries 256. Such a battery 256 provides electrical power to. most if not all electrical circuitry in mobile station 202, and battery interface 254 provides for a mechanical and electrical connection for it. Battery interface 254 is coupled to a regulator (not shown in FIG. 2) which regulates power to all of the circuitry.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access requirements will also vary depending upon type of network utilized. In GPRS networks, for example, network access is associated with a subscriber or user of mobile station 202. A GPRS device therefore requires a Subscriber Identity Module, commonly referred to as a SIM card (i.e. SIM 262 connected via a SIM interface 264 of FIG. 2), in order to operate on the GPRS network. Without such a SIM 262, a GPRS device will not be fully functional. Local or non-network communication functions (if any) may be operable, but mobile station 202 will be unable to carry out any functions involving communications over the network.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (AID) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines extend between a SIM interface 264 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal having an e-mail message or web page download, for example, will be processed by communication subsystem 211 and input to microprocessor 238. Microprocessor 238 will preferably further process the signal for output to display 222 or alternatively to auxiliary I/Q device 228. A user of mobile station 202 may also compose data items, such as e-mail messages or short message service (SMS) messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
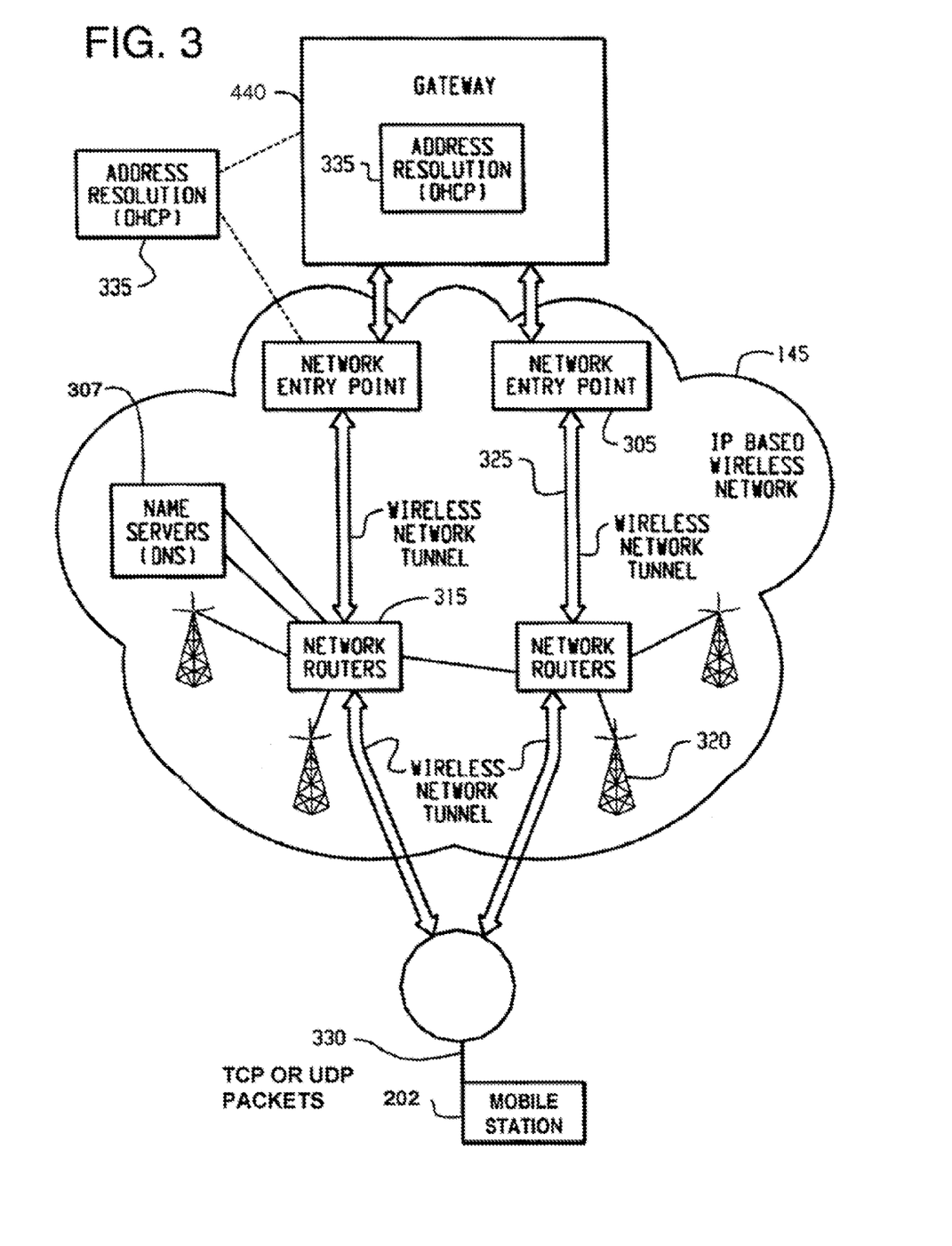
FIG. 3 shows a particular system structure for communicating with the mobile station.

FIG. 3 shows a particular system structure for communicating with mobile station 202. In particular, FIG. 3 shows the basic components of an IP-based wireless data network, such as for the GPRS network described earlier above. Mobile station 202 of FIG. 3 communicates with a wireless packet data network 145 (e.g. the GPRS network) and may also be capable of communicating with a wireless voice network (not shown). The voice network may be associated with IP-based wireless network 145 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (QGSN) as a network entry point 305.

As shown in FIG. 3, a gateway 340 may be coupled to an internal or external address resolution component 335 and one or more network entry points 305. Data packets are transmitted from gateway 340, which is source of information to be transmitted to mobile station 202, through network 145 by setting up a wireless network tunnel 325 from gateway 340 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus preferable for mobile station 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 145 is a network router 315. Normally, network routers 315 are proprietary to the particular network, but they could alternatively be constructed from standard commercially-available hardware. The purpose of network routers 315 is to centralize thousands of base stations 320 normally implemented in a relatively large network into a central location for a long-haul connection back to network entry point 305. In some networks, there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to mobile stations such as mobile station 202.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, mobile station 202 must use a specific technique associated with wireless network 345. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 202 for redundancy, or to access different gateways and services on the network. Once the domain name is found, the tunnel is then extended to network entry point 305 and necessary resources are allocated at each of-the nodes along the way. Network entry point 305 then uses the address resolution (or DHCP 335) component to allocate an IP address for mobile station 202. When an IP address has been allocated to mobile station 202 and communicated to gateway 340, information can then be forwarded from gateway 340 to mobile station 202.

Wireless tunnel 325 typically has a limited life, depending on mobile station's 202 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily-reserved for mobile station 202 when wireless tunnel 325 was first opened. Once the IP address is lost and wireless tunnel 325 is torn down, gateway 340 loses all ability to initiate IP data packets to mobile station 202, whether over Transmission Control Protocol (TCP) or over User Datagram Protocol (UDP).

In this application, an "IP-based wireless network" (one specific type of wireless communication network) may include but is not limited to: (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations. (CEPT); and (3) future third-generation (3G) networks like Enhanced Data rates for GSM Evolution (EDGE) and Universal Mobile Telecommunications System (UMTS). It is to be understood that although particular IP-based wireless networks have been described, the network selection schemes of the present application could be utilized in any similar type of wireless network. The infrastructure shown and described in relation to FIG. 3 may be representative of each one of a number of different networks which are provided and available in the same geographic region. One of these communication networks will be selected by the mobile station for communications at any given time.

Figure 4A:
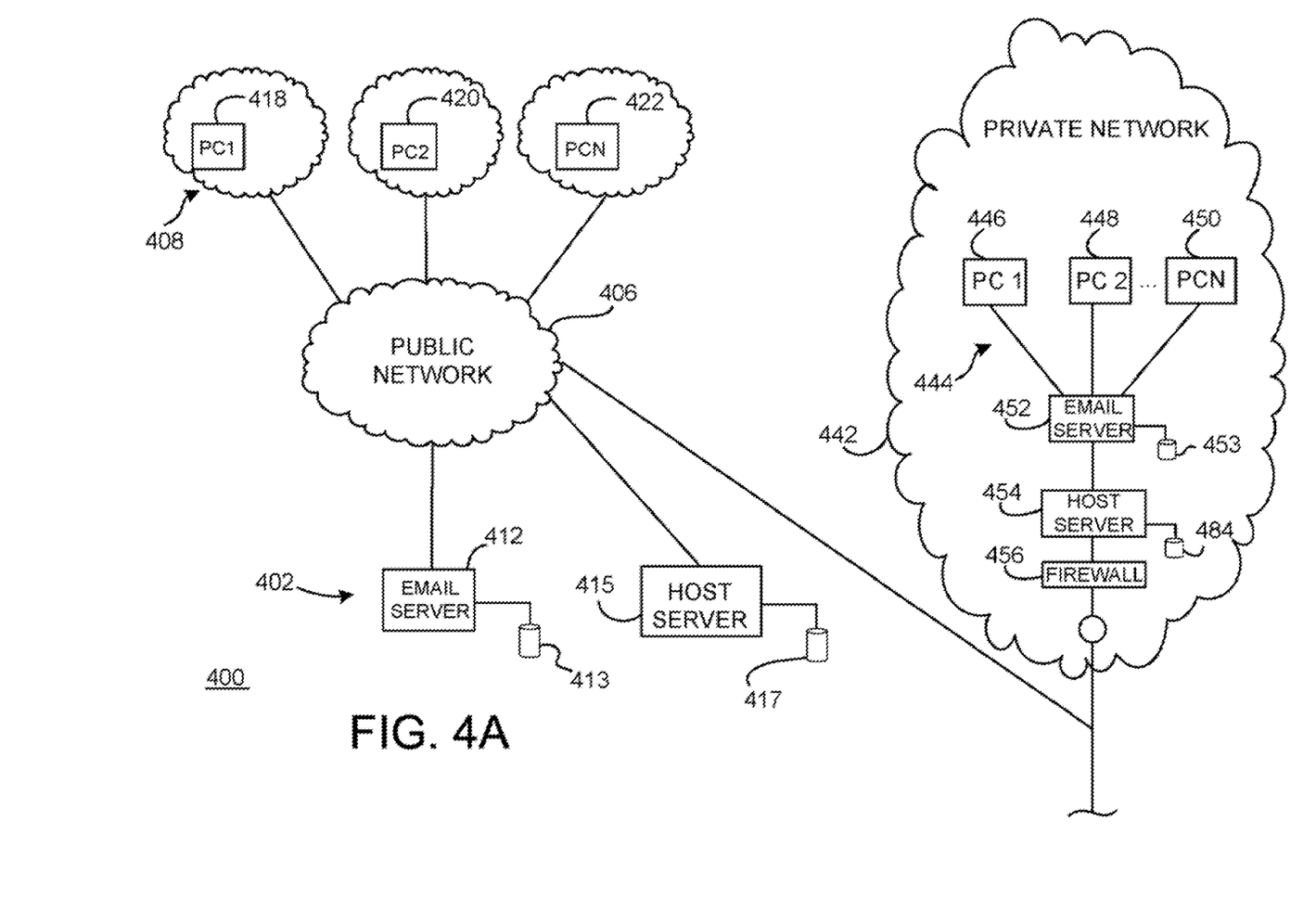
FIGS. 4A-4B depict a larger communication system within which the mobile station in FIGS. 1-3 may operate for receiving e-mail messages which are pushed to it by the system.
Figure 4B:
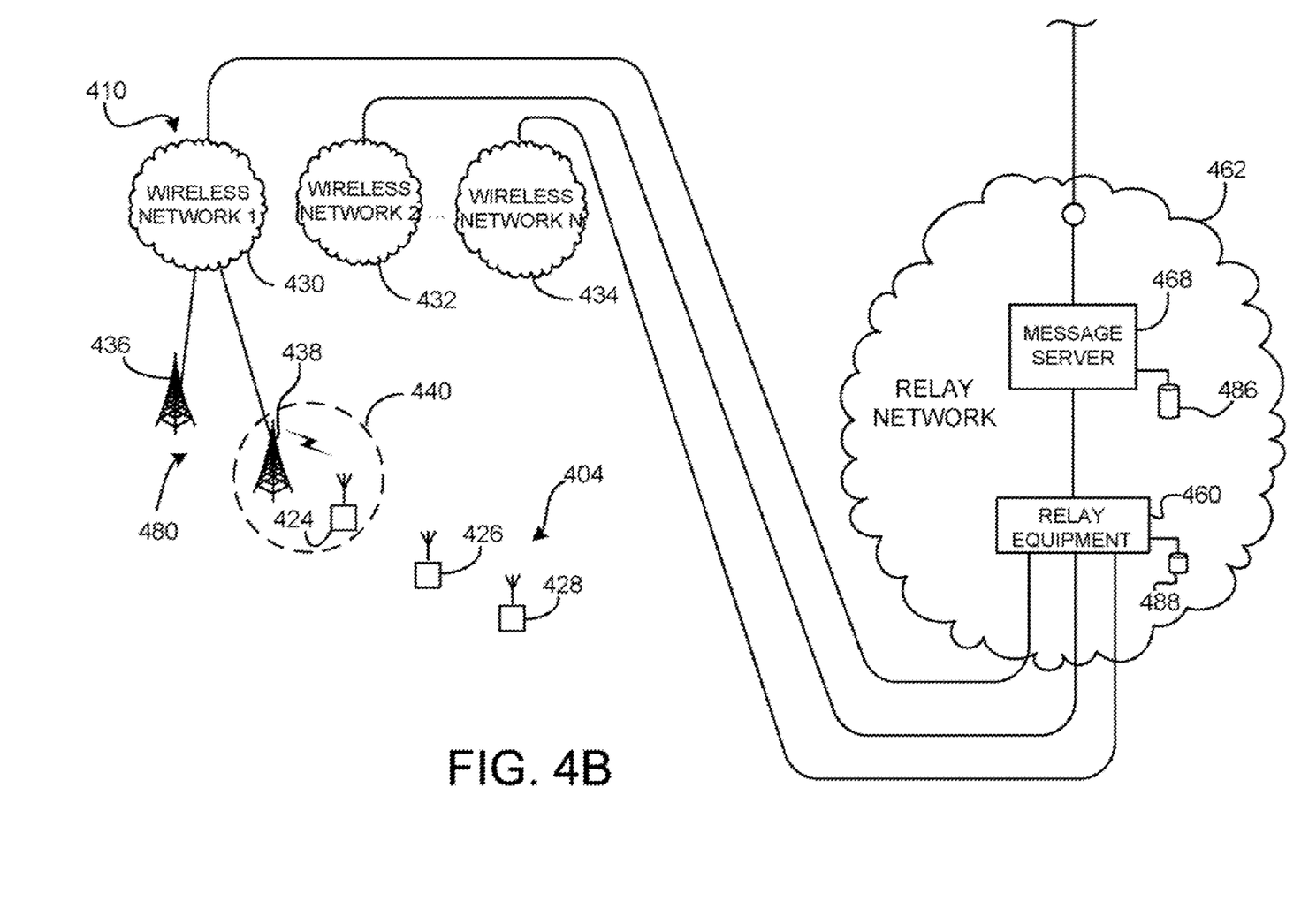

FIGS. 4A-4B depict a communication system 400 in which messages containing e-mail information are pushed from a plurality of e-mail servers 402 (FIG. 4A) to a plurality of mobile communication devices 404 (FIG. 4B). Communication system 400 may be the larger system within which a mobile communication device, such as the mobile station described in relation to FIGS. 1, 2, and 3, may operate. Although messages containing e-mail information are described as being pushed to mobile communication devices in the present embodiment, messages containing various other types of information, such as calendar information, Internet access, telephone communication information, or other various types of data, may be additionally or alternatively pushed to the devices.

The e-mail servers 402 that are shown in FIG. 4A include an e-mail server 412 which serves a plurality of terminals 408 of a public network 406 (e.g. the Internet) and an e-mail server 452 which serves a plurality of terminals 444 of a private network 442. Terminals 408 shown in public network 406 include terminals 418, 420, and 422, whereas terminals 444 shown in private network 442 include terminals 446, 448, and 450. In this embodiment, the terminals are computers such as desktop or laptop PCs which may be connected to e-mail server 412 via the Internet using any conventional means (e.g. telephone dial-up, cable, or DSL modem). End-users of the PCs are able to access their appropriate personal e-mail accounts for sending and receiving new e-mail, as well as reviewing, sorting, organizing, and otherwise managing previously received e-mail stored at the e-mail server.

An end-user of each terminal 408 connected in public network 406 has an e-mail account on e-mail server 412 which stores and manages e-mail messages in a local database 413 of memory for the respective terminal. Each terminal 408 and/or its corresponding e-mail account is associated with a respective one of mobile communication devices 404 (FIG. 4B) to which e-mail information is pushed. Similarly, an end-user of each terminal 444 connected in private network 442 has an e-mail account on e-mail server 452 which stores and manages e-mail messages in a local database 453 of memory for the respective terminal. Each terminal 444 and/or its corresponding e-mail account is associated with a respective one of mobile communication devices 404 to which e-mail information is pushed.

Terminals 444 connected in private network 442 and their respectively e-mail accounts are generally affiliated with each other; that is, they may be associated with the same group or business. For example, terminals 446, 448, and 450 may be utilized by the same company or business and use the same network domain name for e-mail purposes. In private network 442, e-mail server 452 and host server 454 privately serve each end user in the network. On the other hand, terminals 408 connected to public network 406 and their respective e-mail accounts are generally unaffiliated with each other; that is, they are not necessarily associated together with the same business or private network. For example, terminals 418 and 420 are not utilized by the same company nor are they part of the same private network. When an end user of one of terminals 408 accesses e-mail, for example, the end user's terminal is used to connect to e-mail server 412 via the Internet through an Internet Service Provider (ISP) using an appropriate Uniform Resource Locator (URL) (e.g. for a webmail-based service). Using the terminal, the end user sends his/her individual user name and password to log on to this e-mail server. If this user name and password information matches that stored at the e-mail server, the login is successful and an e-mail session is created so that the end-user can perform e-mail tasks.

Each mobile communication device 404 (FIG. 4B) is portable and includes, for example, a hand-held housing with a display and a keyboard/keypad (e.g. miniature QWERTY-type keyboard), as well as a wireless transceiver, an antenna, and one or more processors which control the operation of the device. For example, see FIGS. 1 and 2. Each wireless communication network 410 is coupled to a plurality of base stations for providing wireless coverage for a mobile station.

For example, wireless communication network 430 is shown to have a plurality of base stations 480 including a base station 436 and a base station 438. Each base station (e.g. base station 438) helps establish a wireless coverage area or cell (e.g. a cell 440) within which a mobile communication device (e.g. mobile communication device 424) is able to communicate. Wireless communication networks 410 may include, as examples, cellular telecommunication networks and wireless local area networks (WLANs) (e.g. 802.11 based networks). At least some of wireless communication networks 410 are different from other wireless communication networks within communication system 400.

Each mobile communication device 404 has the ability to send and receive e-mail information associated with its e-mail account managed by one of e-mail servers 412 and 452. The e-mail information is received by each mobile communication device 404 via a (substantially) real-time automatic "push" methodology, in contrast to any method requiring devices 404 to invoke a manual connection for the receipt of e-mail information. The pushing of e-mail information from e-mail servers 412 and 452 to mobile communication devices 404 is facilitated with use of host servers 415 and 454, respectively, which are coupled to a relay network 462 (FIG. 4B). In private network 442, host server 454 communicates with relay network 462 through a firewall 456 which performs at least the conventional function of preventing unauthorized access into such network 442. A trigger mechanism is provided so that, when new e-mail messages are received or updated e-mail information is identified, host server 454 (or host server 415) receives a copy of such information from e-mail server 452 (or e-mail server 412) for delivery to a mobile communication device. Host server 454 has a local database 484 in memory for storing (at least temporarily) such e-mail information received from e-mail server 452, and host server 415 has a local database 417 in memory for storing (at least temporarily) such e-mail information received from e-mail server 412.

Relay network 462 includes a message server 468 and relay equipment 460. Message server 468 is part of a front end of relay network 462 that handles all incoming messages from all host servers into the relay network 462. Relay equipment 460, which is communicatively coupled to message server 462, is part of a back end of relay network 462 that is communicatively coupled to wireless communication networks 410 for relaying all messages to mobile communication devices 404. In general, when a new e-mail message is received at an e-mail server (e.g. e-mail server 452), its corresponding host server (e.g. host server 454) is adapted to receive a copy of e-mail information of the e-mail message for delivery in a message to the associated mobile communication device. Host server 454 causes this message to be delivered to relay network 462, which relays the message to the mobile communication device through the appropriate wireless communication network. Note that relay network 462 may serve a very large number of such host servers and networks (which include host servers 415 and 454 in networks 406 and 442, respectively) for communicating messages generally in this fashion.

Figure 5:
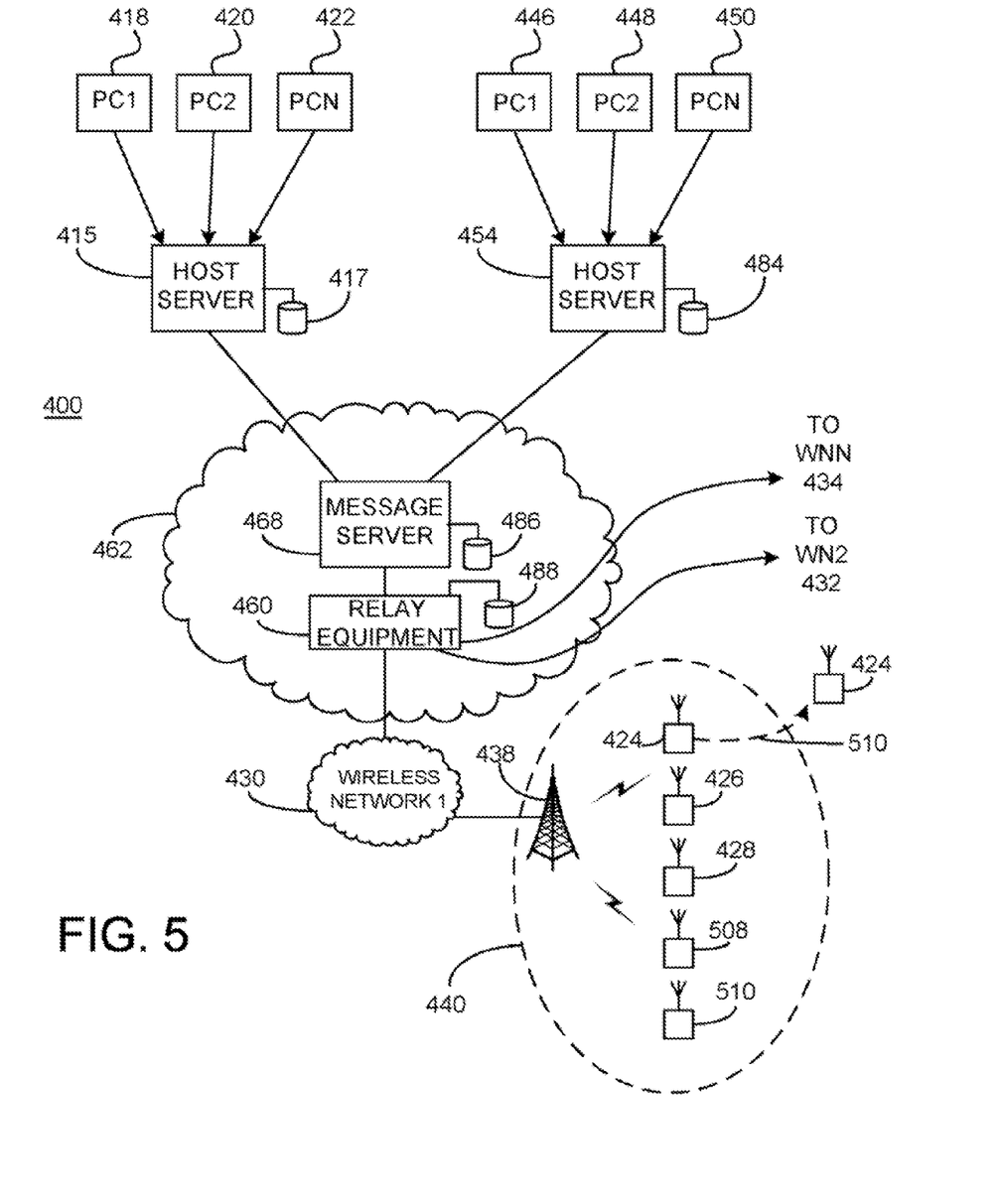
FIG. 5 is a simplified relevant portion of the communication system of FIGS. 4A-4B.

Referring now to FIG. 5, an illustration of a simplified relevant portion of the system of FIGS. 4A-4B is shown. FIG. 5 shows host servers 415 and 454, message server 468 and relay equipment 460 of relay network 462, wireless communication network 430, and various terminals and mobile communication devices operating within their associated networks. In relay network 462, messages containing e-mail information from host servers 415 and 454 are received by message server 468 which, under normal circumstances, will communicate them to relay equipment 460 for delivery to the mobile communication devices. However, a mobile communication device may be temporarily unavailable to receive messages in the wireless communication network. For example, mobile communication device 424 may be outside of coverage area 440 of base station 438 and any other base station of wireless communication network 430 (e.g. see a travel path 510 of mobile device 424 in FIG. 5). In this situation, relay network 462 may be overburdened with the storage and management requirements of all of the e-mail messages. This becomes increasingly problematic when the number of host servers and mobile devices which are served by the relay network increase substantially over time. For cases where a mobile communication device is unavailable, techniques of the present application may be employed by a host server and a relay network as described in relation to FIG. 6 below.

Figure 6:
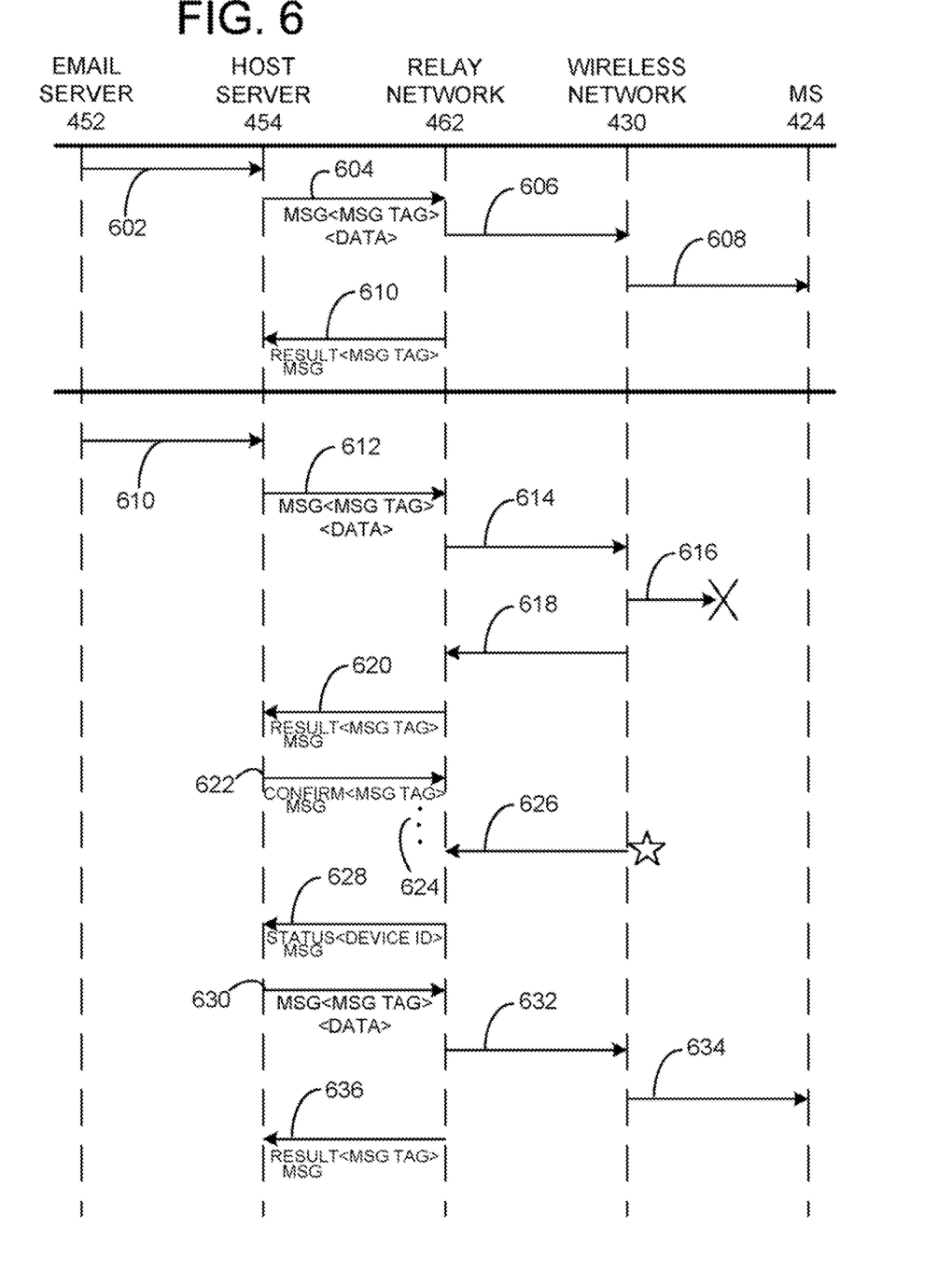
FIG. 6 is a process flow diagram which help describe the techniques of the present application.

FIG. 6 is a process flow diagram for describing "pushback" techniques for use in connection with a host server and a relay network, such as host servers 415 and 454 and relay network 462 described earlier in relation to FIGS. 4A-4B and 5. Message server 468 includes most if not all of the relay network functionality for these "pushback" techniques, embodied as computer instructions stored in a storage medium and executable by a computer processor of the server.

Process steps 602-610 of FIG. 6 depict steps of the present technique when mobile communication device 424 is available to receive messages in wireless communication network 430. The description now makes reference to FIGS. 5 and 6 in combination. An end user of terminal 418 (e.g. a PC) sends an e-mail message to an end user of terminal 446, for example. This e-mail message is received and stored in association with an e-mail account of terminal 446 in local database 453 which is accessible by e-mail server 452. The recipient end user is able to receive and read the e-mail message with use of terminal 446 through a connection with e-mail server 452. When a new e-mail message is received at e-mail server 452, e-mail server 452 causes a copy of e-mail information of the e-mail message to be sent to host server 454, either automatically or by request from host server 454 (process step 602 of FIG. 6). Host server 454 produces an information message addressed to mobile communication device 424 and containing this e-mail information or data.

Host server 454 then wraps up this information message within a relay message which is addressed to relay network 462. For each relay message, host server 454 is adapted to include a message identifier which uniquely corresponds to the relay message, which is one of a large number of relay messages that are communicated within the system on a regular basis. Host server 454 causes the relay message to be sent to relay network 462 (process step 604 of FIG. 6). In FIG. 6, "MSG" corresponds to the relay message, "<DATA>" corresponds to the e-mail information, and "<MSG TAG>" corresponds to the message identifier.

When mobile communication device 424 is available in wireless communication network 430, relay network 462 unwraps the relay message to remove relay-specific information and causes the information message which is addressed to mobile communication device 424 to be sent to wireless communication network 430 (process step 606 of FIG. 6) for delivery to mobile communication device 424 (process step 608 of FIG. 6). In response to a successful delivery of the information message to mobile communication device 424, relay network 462 produces a result message having the message identifier (e.g. "RESULT MESSAGE" having "<MSG TAG>") and causes it to be sent to host server 454 (process step 610 of FIG. 6). In this situation, the result message indicates that the information message has been successfully received by mobile communication device 424. In response to mobile communication device 424 receiving the message, or other confirmation of the same, relay network 462 clears its memory of the e-mail message information (e.g. relay network 462 no longer stores and manages the e-mail message information within database 486 or 488).

Process steps 610-636 of FIG. 6 depict steps of the present technique when mobile communication device 424 is unavailable to receive messages in wireless communication network 430 for at least some period of time. When a new e-mail message is received at e-mail server 452, e-mail server 452. causes a copy of e-mail information of the e-mail message to be sent to host server 454, either automatically or by request from host server 454 (process step 610 of FIG. 6). Host server 454 produces an information message addressed to mobile communication device 424 and containing this e-mail information or data. Host server 454 then wraps up this information message within a relay message which is addressed to relay network 462. For each relay message, host server 454 is adapted to include a message identifier which uniquely corresponds to the relay message, which is one of a large number of relay messages that are communicated within the system on a regular basis. Host server 454 causes the relay message to be sent to relay network 462 (process step 612 of FIG. 6). Again in FIG. 6, "MSG" corresponds to the relay message, "<DATA>" corresponds to the e-mail information, and "<MSG TAG>" corresponds to the message identifier.

In this scenario, mobile communication device 424 is at least temporarily unavailable to receive messages in wireless communication network 430 for some unknown period of time (e.g. it is out-of-coverage). If one or more attempts to send the information message were to be performed by relay network 462 or wireless communication network 430, mobile communication device 424 would fail to receive the information message (process step 616 of FIG. 6). Relay network 462 identifies that mobile communication device 424 is at least temporarily unavailable to receive messages in wireless communication network 430 through at least some indication from wireless communication network 430 (process step 618 of FIG. 6). In response to the mobile communication device 424 being unavailable to receive messages, relay network 462 produces a result message having the message identifier (e.g. "RESULT MESSAGE" having "<MSG TAG>") and causes it to be sent to host server 454 (process step 620 of FIG. 6). In this scenario, the result message indicates to host server 454 that the information message has not been successfully received by mobile communication device 424. Preferably, the result message produced by relay network 462 does not include the e-mail information or data of the information message.

In one embodiment, in some situations and for some wireless networks, the wireless network itself determines the mobile device's state of availability independently from relay network 462 and sends an indication of the mobile device's state to relay network 462 (process step 626) in response to the mobile device's state change. In another embodiment, in other situations and for other wireless networks, the wireless network is not operative to determine the mobile device's state of availability but relay network 462 itself determines the state. For example, in process steps 616 and 618, relay network 462 attempts to send the relay message to mobile communication device 424 a plurality of times (or at least one time) through wireless communication network 430. If the relay message comes back to relay network 462 as "undeliverable" on each attempt, or there are failures to receive any acknowledgement messages for each attempt, then relay network 462 identifies the indication of mobile device unavailability (process step 626) and sends the result message to host server 454 (process step 628).

Host server 454 receives the result message in process step 620 and, in response, produces and sends a confirmation message having the message identifier to relay network 462 (e.g. "CONFIRM MSG" having "<MSG TAG>"). Relay network 462 then receives the confirmation message. In response to sending the result message to. host server 454 (process step 620) or receiving the confirmation message from host server 454 (process step 622), relay network 462 clears its memory of the e-mail message information associated with message identifier. For example, relay network 462 refrains from further storing and managing of the e-mail message information within database 486 and/or 488 (e.g. the e-mail message information may be deleted from databases 486 and 488 of memory).

As mobile communication device 424 failed to receive the information message due to its unavailability, however, relay network 462 creates a subscription record for mobile communication device 424. The subscription record includes the address associated with mobile communication device, and may or may not include the message identifiers associated with the undelivered messages. The address may be, as examples, an IP address, a telephone number, or a personal identification number (PIN) uniquely associated with mobile communication device 424. This address information is obtained by relay network 462 since the information message includes and is destined to such address of mobile communication device 424. In any case, however, the subscription record does not include the e-mail information of any pending undelivered messages to mobile communication device 424.

Thus, host server 454 is held responsible for the storage and management of the e-mail information being delivered. Host server 454 may maintain storage of the e-mail information within its database 484 or, alternatively, transfer responsibility for storage and management to its associated e-mail server. Where host server 454 is maintaining responsibility, host server 454 may store an indication of each undelivered e-mail message (e.g. by message identifier) in association with the address of each mobile communication device. Thus, host server 454 may later identify and/or retrieve such e-mail information for resending to mobile communication devices based on the address and/or message identifier(s).

After some period of time elapses (a passage of time 624 in FIG. 6), mobile communication device 424 will once again become available to receive messages in wireless communication network 430. An indication of this availability will be identified by relay network 462 (process step 626 of FIG. 6). In response, relay network 462 produces a status message which indicates the mobile device's availability and sends it to host server 454 (step 628 of FIG. 6) (e.g. "STATUS MSG" having "<MSG TAG>"). The status message includes the stored address which uniquely corresponds to mobile communication device 424. Preferably, relay network 462 produces and sends the status message to host server 454 automatically in response to identifying the mobile device's availability. In this case, the initial message sent from host sever 454 to relay network 462 (process step 612) may have an instruction indication which indicates whether or not host server 454 desires that relay network 462 automatically send a status message in response to the mobile device's renewed availability. Alternatively, the status message is produced and sent to host server 454 in response to a state request message which host server 454 sends to relay network 462. Host server

454 may produce and send such a state request message to relay network 462 a number of times over the passage of time 624, in response to expirations of fixed time periods and/or other suitable trigger mechanisms.

In response to the status message which indicates the mobile device's renewed availability, host server 454 causes the relay message having the message identifier to be resent to relay network 462 (process step 630 of FIG. 6). This relay message was described previously in relation to process step 612 of FIG. 6. In FIG. 6, "MSG" corresponds to the relay message, "<DATA>" corresponds to the e-mail information, and "<MSG TAG>" corresponds to the message identifier. When mobile communication device 424 is available in wireless communication network 430, relay network 462 unwraps the relay message to remove relay-specific information and causes the information message which is addressed to mobile communication device 424 to be sent to wireless communication network 430 (process step 632 of FIG. 6) for delivery to mobile communication device 424 (process step 634 of FIG. 6). In response to a successful delivery of the information message to mobile communication device 424, relay network 462 produces a result message having the message identifier (e.g. "RESULT MESSAGE" having "<MSG TAG>") and causes it to be sent to host server 454 (process step 634 of FIG. 6).

Advantageously, messages are reliably delivered to mobile communication devices despite their temporary unavailability, without unduly burdening a relay network in terms of memory and processing power. Instead, responsibility of message delivery is "pushed back" to host servers once mobile device unavailability is identified; memory and processing power are spread across the numerous host servers which are served by the relay network.

As described herein, one illustrative method for use by a host server in pushing messages to a mobile communication device involves the steps of causing a message to be sent to a relay network for delivery to the mobile communication device through one of a plurality of wireless communication networks which are communicatively coupled to the relay network; receiving, from the relay network, a result message when the mobile communication device is unavailable to receive the message through the wireless communication network, the result message comprising a message identifier which uniquely corresponds to the message; maintaining storage of the message in memory accessible by the host server after the result message is received; receiving, from the relay network, a status message which indicates that the mobile communication device is available to receive the message when the mobile communication device is available to receive the message through the wireless communication device; and causing the message to be sent again to the relay network for delivery to the mobile communication device in response to receiving the status message. During the unavailability of the mobile device, the relay network refrains from maintaining storage of the message.

Another illustrative method for use by a relay network in pushing messages to a mobile communication device involves the steps of receiving, at the relay network, a message from a host server for delivery to the mobile communication device through one of a plurality of wireless communication networks which are communicatively coupled to the relay network; causing a result message to be sent to the host server based on identifying that the mobile communication device is unavailable to receive the message through the wireless communication network, where the result message comprises a message identifier which uniquely corresponds to the message; refraining from maintaining storage and management of the message in memory of the relay network after the result message is sent to the host server; causing a status message which indicates that the mobile communication device is available to receive the message to be sent to the host server based on identifying that the mobile communication device is available to receive the message through the wireless communication device, where the status message comprises the message identifier which uniquely corresponds to the message; and receiving again, at the relay network, the message corresponding to the message identifier from the host server for delivery to the mobile communication device in response to the status message being sent to the host server.

The above-described embodiments of invention are intended to be examples only. Alterations, modifications, and variations may be effected to embodiments by those of skill in art without departing from scope of invention, which is defined solely by claims.

What is claimed is:

1. A method for use by a relay network which serves a plurality of host servers in communication networks outside of the relay network for pushing messages to mobile communication devices, the method comprising the acts of:

receiving, at the relay network, a message from one of the host servers of a communication network outside of the relay network, the message containing user information and being intended for delivery to a mobile communication device through one of a plurality of wireless communication networks which are communicatively coupled to the relay network;

in response to receiving the message at the relay network when the mobile communication device is unavailable to receive the message through the wireless communication network:

causing a result message to be sent, from the relay network to the host server, which indicates that the mobile communication device is unavailable to receive the message through the wireless communication network, the result message comprising a message identifier designated by the host server which uniquely identifies the message from other messages;

receiving, at the relay network, a confirmation message from the host server which indicates that the result message was received by the host server; and deleting the message from memory of the relay network in response to receiving the confirmation message;

causing a status message which indicates that the mobile communication device is available to be sent from the relay network to the host server based on identifying that the mobile communication device is available to receive the message through the wireless communication network; and receiving again, at the relay network from the host server, the message corresponding to the message identifier in response to the status message being sent to the host server, for delivering the message to the mobile communication device through the wireless communication network.

2. The method of claim 1, wherein the act of causing the result message to be sent comprises the further act of refraining to include the message within the result message.

3. The method of claim 1, wherein the act of receiving the message at the relay network comprises receiving the message along with the message identifier which uniquely corresponds to the message.

4. The method of claim 1, further comprising:

prior to identifying that the mobile communication device is unavailable, attempting to send the message to the mobile communication device at least one time through the wireless communication network;

failing to receive any acknowledgement message from attempting to send the message to the mobile communication device; and identifying that the mobile communication device is unavailable to receive the message through the wireless communication network based on failing to receive any acknowledgement message.

5. The method of claim 1, further comprising:

receiving, at the relay network, a state request message from the host server; and causing the status message which indicates that the mobile communication device is available to be sent to the host server in response to receiving the state request message from the host server, the status message comprising an address associated with the mobile communication device.

6. The method of claim 1, wherein the act of receiving the message comprises the further act of receiving, within the message, an instruction indication to receive the status message from the relay network in response to the relay network's identifying that the mobile communication device is available.

7. The method of claim 1, wherein the message comprises an electronic mail (e-mail) message or other application data message.

8. A message server of a relay network which is configured to serve a plurality of host servers in communication networks outside of the relay network for delivering messages to mobile communication devices, the message server of the relay network being further configured to receive a message from one of the host servers of a communication network outside of the relay network, the message containing user information and being intended for delivery to a mobile communication device through one of a plurality of wireless communication networks which are communicatively coupled to the relay network; in response to receiving the message at the message server when the mobile communication device is unavailable to receive the message through the wireless communication network: cause a result message to be sent, from the message server to the host server, which indicates that the mobile communication device is unavailable to receive the message through the wireless communication network, the result message comprising a message identifier designated by the host server which uniquely identifies the message from other messages; receive a confirmation message from the host server which indicates that the result message was received by the host server; and deleting the message from memory of the relay network in response to receiving the confirmation message; cause a status message which indicates that the mobile communication device is available to be sent from the message server to the host server based on identifying that the mobile communication device is available to receive the message through the wireless communication network; and receive again, at the message server from the host server, the message corresponding to the message identifier in response to the status message being sent to the host server, for delivering the message to the mobile communication device through the wireless communication network.

9. The message server of claim 8, which is further configured to refrain from including the message within the result message.

10. The message server of claim 8, which is further configured to receive the message along with the message identifier which uniquely corresponds to the message.

11. The message server of claim 8, which is further configured to attempt to send the message to the mobile communication device at least one time through the wireless communication network prior to identifying that the mobile communication device is unavailable; fail to receive any acknowledgement message from attempting to send the message to the mobile communication device; and identify that the mobile communication device is unavailable to receive the message through the wireless communication network based on failing to receive any acknowledgement message.

12. The message server of claim 8, which is further configured to receive a state request message from the host server and cause the status message which indicates that the mobile communication device is available to be sent to the host server in response to receiving the state request message from the host server.

13. The message server of claim 8, which is further configured to receive the message by receiving an instruction indication from the host server to receive the status message from the message server in response to identifying that the mobile communication device is available.

14. A method for use by a host server of a communication network in pushing messages to a mobile communication device, the method comprising the acts of:

causing a message to be sent from the host server of the communication network to a relay network serving a plurality of host servers of communication networks outside of the relay network, the message containing user information and being intended for delivery to the mobile communication device through one of a plurality of wireless communication networks which are communicatively coupled to the relay network;

in response to the message being sent to the relay network when the mobile communication device is unavailable to receive the message through the wireless communication network:

receiving, at the host server from the relay network, a result message which indicates that the mobile communication device is unavailable to receive the message through the wireless communication network, the result message comprising a message identifier designated by the host server which uniquely identifies the message from other messages;

in response to receiving the result message: maintaining storage of the message corresponding to the message identifier in memory of the host server, and causing a confirmation message which indicates that the result message was received by the host server to be sent to the relay network for causing the relay network to delete the message from memory of the relay network;

when the mobile communication device is available to receive the message through the wireless communication network, receiving, at the host server from the relay network, a status message which indicates that the mobile communication device is available; and causing the message corresponding to the message identifier to be sent again from the host server to the relay network in response to receiving the status message, for delivering the message to the mobile communication device through the wireless communication network.

15. The method of claim 14, wherein the act of receiving the result message comprises the further act of failing to receive the message within the result message.

16. The method of claim 14, wherein the act of causing the message to be sent to the relay network comprises including the message identifier which uniquely corresponds to the message to be included in the message.

17. The method of claim 14, further comprising:
identifying the message from the memory with use of the message identifier.

18. The method of claim 14, further comprising:
causing a state request message to be sent to the relay network; and
receiving, from the relay network, the status message which indicates that the mobile communication device is available in response to causing the state request message to be sent, the status message comprising an address of the mobile communication device.

19. The method of claim 14, wherein the act of causing the message to be sent comprises the further act of including an instruction indication in the message to receive the status message from the relay network in response to identifying that the mobile communication device is available.

20. The method of claim 14, wherein the message comprises an electronic mail (e-mail) message or other application data message.

21. A host server for a communication network, the host server being configured to cause a message to be sent to a relay network serving a plurality of host servers of communication networks outside of the relay network, the message containing user information and being intended for delivery to a mobile communication device through one of a plurality of wireless communication networks which are communicatively coupled to the relay network; in response to the message being sent to the relay network when the mobile communication device is unavailable to receive the message through the wireless communication network: receive, at the host server from the relay network, a result message which indicates that the mobile communication device is unavailable to receive the message through the wireless communication network, the result message comprising a message identifier designated by the host server which uniquely identifies the message from other messages; in response to receiving the result message: maintain storage of the message in memory of the host server, and cause a confirmation message which indicates that the result message was received by the host server to be sent to the relay network for causing the relay network to delete the message from memory of the relay network; when the mobile communication device is available to receive the message through the wireless communication network, receive, at the host server from the relay network, a status message which indicates that the mobile communication device is available; and cause the message to be sent again from the host server to the relay network in response to receiving the status message, for delivery of the message to the mobile communication device through the wireless communication network.

22. The host server of claim 21, which is further configured to receive the result message which fails to include the message.

23. The host server of claim 21, which is further configured to cause the message to be sent to the relay network along with the message identifier which uniquely corresponds to the message.

24. The host server of claim 21, which is further configured to identify the message from the memory with use of the message identifier.

25. The host server of claim 21, which is further configured to cause a state request message to be sent to the relay network; and receive, from the relay network, the status message which indicates that the mobile communication device is available in response to causing the state request message to be sent.

26. The host server of claim 21, which is further configured to cause the message to be sent along with an instruction indication in the message to receive the status message from the relay network in response to identifying that the mobile communication device is available.

* * * * *